UNITED STATES PATENT OFFICE 1,934,638

ALKALINE FILLER

Harold Robert Rafton, Andover, Mass., assignor to Raffold Process Corporation, a corporation of Massachusetts No Drawing. Application July 18, 1930
Serial No. 468,985

10 Claims. (Cl. 91—68)

My invention relates to an improved alkaline filler.

The principal object of my invention is to provide an improved alkaline filler and paper filled and/or coated therewith.

An important object is to provide an improved alkaline filler, the particle sizes of which are more homogeneous than those of the alkaline filler from which it was produced.

A further object is to provide an improved alkaline filler, the distribution of particle sizes of which is more limited than that of the alkaline filler from which it was produced.

A further object is the production of an improved paper filled with homogenized alkaline filler.

A further object is the production of an improved paper coated with homogenized alkaline filler.

Other objects and advantages will become apparent in the course of the following description.

Alkaline fillers may be produced by two general methods. They may be produced according to the first method either by the interaction of two materials in solution or by the interaction of a gas and a solution: for example, solutions of calcium chloride and sodium carbonate react to produce a precipitate of calcium carbonate (an alkaline filler) and a solution of sodium chloride; likewise, for example, a clear solution of barium hydroxide and carbon dioxide react to produce a precipitate of barium carbonate (an alkaline filler). Alkaline fillers so produced, because they are thrown down from solution, have a substantially uniform particle size, characteristically coarse or fine according to the conditions under which the reaction takes place, and according to the form which any given alkaline filler can naturally or artificially assume.

The second general method for the production of alkaline fillers is that in which, in a fluid medium, a base is reacted upon which is difficultly soluble or only partially soluble at the concentration at which the reaction takes place. Such a base may be lime or lime containing magnesia, magnesia, baryta, strontia, or the like. In such case there is always present a greater or lesser proportion of the base as a solid phase during at least part of the reaction, and of course there is normally coincidentally present a certain amount of the base in dissolved condition. The base may be present in a state of relatively fine subdivision in a liquid suspension, milk or mud, and usually this suspension, milk or mud, is an aqueous one, such for example as lime in water, previously slaked if desired. The base is reacted upon to produce the alkaline filler usually by a soluble material such as sodium carbonate, either as a solid or in solution, or by a gas such as carbon dioxide. Of course the base need not be made into a suspension prior to the reaction, but may be made so coincidentally therewith as for example when lime is added to a solution of sodium carbonate.

It has been found that the particle size and size distribution of alkaline fillers produced by the second general method are allied to the particle size and particle size distribution of the bases from which they are produced. It is obvious that as these bases are not of a completely homogeneous particle size and size distribution the alkaline fillers produced therefrom will also not be completely homogeneous as to particle size and size distribution.

Alkaline fillers produced by the first method are expensive. Alkaline fillers, produced by the second method, on the other hand, in many instances may be procured very inexpensively, as they are produced in a number of processes, for example in the causticizing process, as by-products or co-products. Such processes thus constitute a very economical source of alkaline fillers produced by the second method.

Alkaline fillers made by the second method, however, although much less expensive than those made by the first method have been found to have different characteristics as evidenced by the fact that paper filled and/or coated therewith possesses certain defects. The reason for these defects was at first very obscure, but as the result of an extended research I have found that the different characteristics of the fillers made by the second method and the defects in the paper made therewith are caused by the above described non-homogeneity of the filler, and particularly by the presence of oversize particles therein.

It is to alkaline fillers of the type not originally of a substantially homogeneous particle size, such for example as alkaline fillers made by the second general method given above, that my invention is directed, and where the term "alkaline filler" is hereafter used in this description or in the claims, it is intended to refer only to alkaline fillers of this type.

While alkaline fillers (i. e. of this type) are non-homogeneous, I have nevertheless found that in any given alkaline filler, the majority of particles, and usually the great majority of particles, are of approximately one size, and this particle size is responsible for imparting certain general distinguishing characteristics to any individual alkaline filler. I term these characteristic particles "ultimate" particles, and although there may be present a relatively minor amount of particles smaller than the ultimate particles, which may be termed "subultimate" particles, the subultimate particles play but a minor role in determining the general characteristics of an alkaline filler, and they may thus be grouped with the ultimate. As an example of the effect of ultimate particle size as determining the general nature of an alkaline filler, calcium carbonate in the form of "lime mud" may be cited as being characterized by a relatively coarse ultimate particle size, whereas calcium carbonate magnesium hydroxide may be cited as being characterized by a relatively fine ultimate particle size.

In addition to the ultimate particles, I have found that alkaline fillers contain two other main groups of particles. The first I term "oversize", and the second I term "intermediate". All particles larger than the ultimate fall into one or the other of these two groups.

Practically all alkaline fillers have been put through a fine mesh screen in the process of their manufacture, usually 150 mesh or even finer, for example 200 mesh in certain cases. The presence of any particles larger than will pass through the mesh originally used is therefore fortuitous. The particles in the combined "oversize" and "intermediate" groups thus consist of all sizes ranging from those just passing through 150 or 200 mesh as the case may be down to the size of the ultimate particles.

As stated above I have found that in the use of alkaline fillers particularly for coating or filling paper the presence of oversize particles, i. e. particles larger than a certain limiting size, is the important cause of defects in the paper produced therewith. So far as I am aware no one has previously determined this limiting particle size. By careful experimentation I have determined that this limiting particle size is approximately .001". All particles in an alkaline filler which are greater than approximately .001" I have termed "oversize" particles, whereas all particles between the oversize and the ultimate I have termed "intermediate", and in this description and appended claims the terms "oversize" and "intermediate" are to be considered as having the above defined meanings.

I have found that the oversize particles are very deleterious in alkaline fillers used for coating paper or for filling paper, because in coated paper they cause lumps in the coating with subsequent dusting during the drying, reeling and calendering operations, and are a cause of unevenness of finish and non-uniformity in the printing qualities of the resulting paper. In filling paper, the oversize particles tend to settle out, especially when the stock is in dilute suspension cause uneven distribution of the filler throughout the sheet, particularly cause unevenness of finish in the sheet and in its printing qualities, and require that the paper receive excess pressure on calendering to produce a given finish.

The intermediate particles are not detrimental in the sense that the oversize is detrimental, but the percentage of them present as well as their average size influences the general characteristics imparted to either coated or filled paper by any given alkaline filler.

The reduction of the oversize particles in alkaline fillers is thus greatly to be desired. Attempt has previously been made to reduce the particle size of alkaline fillers and/or the "grit" therein by grinding as in pebble, ball, or rod mills, and this method if carried far enough will completely reduce and thus eliminate the oversize. But in so doing it also reduces the other particle sizes, i. e. the intermediate and the ultimate, with the result that the general characteristics of an alkaline filler are profoundly modified, which in certain cases is very undesirable. The effect of such grinding is not to render an alkaline filler completely homogeneous as to particle size, but rather to move the curve of particle size distribution toward smaller sizes, each particle size being progressively reduced. Furthermore the grinding method has the disadvantage of discoloring the alkaline filler, especially in the case of the severe treatment required to completely grind or reduce all the oversize.

Other methods such as elutriation or hydroseparation have been tried in an attempt to remove the oversize of alkaline fillers, but semicommercial trials with the most efficient apparatus at present available have proven that such methods do not remove sufficient oversize so that a suitable quality of alkaline filler may be produced thereby. Moreover the apparatus required in such methods is very large and expensive, requires excessive floor space, and involves reconcentration of solids from the necessarily dilute suspensions in which hydroseparation is required to be effected. Air flotation methods have also been tried but these have likewise proved incapable of producing suitable quality of alkaline filler, and furthermore these methods have the very great disadvantage of requiring the drying of the alkaline filler before they can be employed. This is costly and in certain cases results in agglomeration of particles on drying which agglomerates do not readily disperse on subsequent wetting. Also such methods do not function properly where oversize particles of different specific gravity exist in the alkaline filler.

I have devised, however, two methods by which the oversize can be substantially reduced, if not substantially completely eliminated, in the wet condition, namely by passage through a special type colloid mill, such as is disclosed in my copending application Serial No. 459,816, filed June 7, 1930, or by passage through a homogenizer, which process I disclose in my copending application Serial No. 468,984, filed July 18, 1930. Both the special type colloid mill and homogenizer have gaps for the passage of material therethrough the width of which is controlled by yieldable pressure.

The characteristics of alkaline filler treated by either of the above methods are very similar, and the two methods may be said to produce material which may be considered as substantially identical from a commercial standpoint. The characteristics of any given alkaline filler which has been treated by either of these methods varies somewhat with the ultimate particle size of the alkaline filler treated.

The preponderating effect of such treatment is to reduce the size of the oversize, and the reduced oversize thus gives an increased percentage of intermediate particles, and to a lesser degree may give a very slightly increased amount of ultimate particles produced from the breaking down of the oversize. However, this latter increase is not of substantial amount. Likewise there is a tendency for the larger intermediate particles to be reduced to smaller intermediate particles. Only when the ultimate particle size is comparatively coarse is there any perceptible reduction of the ultimate and then this reduction does not take place indefinitely as when grinding in a pebble mill, but only to a limited degree. Thus the production of excessively fine or colloidal particles which occurs during a grinding mill operation is avoided. Moreover by this treatment the color (whiteness) of an alkaline filler is substantially unaffected, a point of very great importance, as the economic value of an alkaline filler is greatly influenced by its color. It will be noted that by the treatments described above, no part of the alkaline filler is either temporarily or permanently separated therefrom.

It will thus be seen that the treatments above referred to produce alkaline fillers of characteristics different from any heretofore produced, and alkaline fillers so treated are chiefly characterized by the fact that their particle size distribution has been limited in extent owing to the reduction of the larger particle sizes. Because the range of particle size distribution is thus restricted, and the particle sizes made more nearly homogeneous, previously non-homogeneous alkaline filler so treated and/or possessing the above described characteristics I term "homogenized alkaline filler". A homogenized alkaline filler will differ substantially from the alkaline fillers made by the first general method described above as the latter fillers have a substantially uniform particle size, and contain substantially only ultimate particles.

Although not so desirable from the standpoint of quality, in some cases for economic reasons it is not feasible to carry the treatment of an alkaline filler so far as to completely eliminate the oversize, and in certain cases results commercially satisfactory in a degree have been secured by a reduction of only a portion of the oversize. A so-treated alkaline filler may however still be termed an "homogenized alkaline filler", because as a matter of fact the larger oversize are the first ones to be reduced, thus the range of particle size distribution has been restricted, the number of individual oversize particles has also been reduced, and thus a larger percentage of the total particles of the filler are more nearly alike in size than before treatment.

I have found that paper filled with homogenized alkaline filler is of a better quality than paper filled with unhomogenized alkaline filler, the paper being more uniform throughout its body due to the more even distribution of the filler therein, possessing more uniform surface due to reduction of oversize in the filler, requiring less pressure on the calenders and possessing better printing qualities. Such improved paper may be sized with suitable sizing, such as rosin size, paraffin emulsions or the like which may be used in sizing carbonate filled papers as shown, for example, in my issued Patents Nos. 1,803,642, 1,803,645, 1,803,650, 1,803,651 and 1,803,652, all issued May 5th, 1931, or may be unsized as desired.

Likewise I have found that paper coated with homogenized alkaline filler (mixed with a suitable adhesive, of course, such as the customary adhesives ordinarily employed for the purpose, for example, casein, as referred to (among other places) in the article by Belle on page 445 of the January 1st, 1925 issue of "Paper", and with or without other mineral pigments as desired) is much more uniform in finish, in certain instances can be made with less adhesive, thereby having the double advantage of more economical production and higher surface gloss, shows much less tendency to dust than does paper coated with unhomogenized alkaline filler, and prints more evenly and uniformly.

It will thus be apparent that as my novel homogenized alkaline filler may be produced relatively inexpensively, it will result in the production of improved quality filled and coated papers made with inexpensive alkaline fillers, and will thus result in a marked increase in the use of alkaline fillers with resultant economy in production in the manufacture of filled and coated papers.

Instead of treating the alkaline filler itself by either of the above two processes, I have found it possible in certain cases to treat the base from which the alkaline filler is to be manufactured prior to the manufacture of the alkaline filler, and find that this treatment results in the production of substantially homogenized alkaline filler.

By the term "alkaline filler" I mean substantially water insoluble filler produced from a base of an alkaline earth metal or metals, (which expression is herein intended to include magnesium), difficultly soluble or only partially soluble at the concentration at which the reaction takes place, and which base is present in a greater or lesser proportion as a solid phase during at least part of the reaction necessary to produce the filler. Such filler when agitated in contact with freshly boiled distilled water, say for an hour, will impart a pH value to such water greater than 7.0, i. e. a pH value which will be on the alkaline side of the neutral point. Among fillers included in this group may be mentioned lime mud from the causticizing process (calcium carbonate); calcium carbonate magnesium basic carbonate employed in the paper disclosed in my U. S. Patent No. 1,595,416 issued August 10, 1926; calcium carbonate magnesium hydroxide disclosed in my U. S. Patent No. 1,415,391 issued May 9, 1922; and other substantially water insoluble normal or basic carbonates of alkaline earth metals, or compounds, double salts, or physically associated mixtures of these with one or more other acid soluble materials of a substantially water insoluble nature.

I also mean to include such compounds which may not necessarily be produced from a difficultly or partially soluble base as above described, but which occur naturally in massive form and/or which require comminution prior to use, such for instance as chalk, limestone, etc. Such materials when comminuted commercially produce non-homogeneous alkaline fillers which although not generally of such good quality as those produced by the second general method mentioned above, nevertheless when treated by the two processes mentioned herein produce alkaline fillers with characteristics analogous to those of the homogenized alkaline fillers derived from the alkaline fillers defined in the preceding paragraph.

I mean, however, specifically to exclude the coating pigment "satin white" from the scope of the expression "alkaline filler" as defined herein, as satin white is not substantially water insoluble. I disclose and claim homogenized satin white and paper coated therewith in my copending application Serial No. 468,987, filed July 18, 1930.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, felting, shaping or molding machine.

While I have described in detail the preferred embodiments of my invention, it is to be understood that my invention may be varied considerably within the limitations required by the disclosures of the prior art without departing from the spirit of my invention or the scope of the subjoined claims.

I claim:

1. The method of producing improved alkaline filler from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler.

2. The method of producing improved alkaline filler, comprising causticizing sludge comprising calcium carbonate, from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler.

3. The method of producing improved alkaline filler from alkaline filler having oversize, intermediate and ultimate particles, which comprises substantially eliminating particles exceeding .001" in size, and maintaining the ultimate particles of substantially the same size as the ultimate particles in the alkaline filler employed in producing said improved alkaline filler, while substantially increasing the proportion of intermediate to ultimate particles over the proportion of the intermediate to ultimate particles in said employed alkaline filler, thus producing an improved filler having a total weight substantially the same as said employed filler.

4. The method of producing filler paper which comprises fibrous material and improved alkaline filler produced from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler, and adding said improved filler to said fibrous material.

5. The method of producing filled paper which comprises fibrous material and improved alkaline filler, which comprises causticizing sludge comprising calcium carbonate, produced from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler, and adding said improved filler to said fibrous material.

6. The method of producing filled paper which comprises fibrous material and improved alkaline filler produced from alkaline filler having oversize, intermediate and ultimate particles, which comprises substantially eliminating particles exceeding .001" in size and maintaining the ultimate particles of substantially the same size as the ultimate particles in the alkaline filler employed in producing said improved alkaline filler, while substantially increasing the proportion of intermediate to ultimate particles over the proportion of the intermediate to ultimate particles in said employed alkaline filler, thus producing an improved filler having a total weight substantially the same as said employed filler, and adding said improved filler to said fibrous material.

7. The method of producing coated paper comprising fibrous body stock and a coating comprising adhesive and improved alkaline filler produced from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler, and applying said improved filler and said adhesive to said fibrous body stock.

8. The method of producing coated paper comprising fibrous body stock and a coating comprising adhesive and improved alkaline filler, which comprises causticizing sludge comprising calcium carbonate, produced from alkaline filler having oversize, intermediate and ultimate particles, which comprises substantially reducing the proportion by weight of particles exceeding .001" in size, substantially correspondingly increasing the proportion by weight of intermediate particles, and maintaining the proportion by weight and the size of ultimate particles substantially unchanged, with respect to the alkaline filler employed in producing said improved filler, thus producing an improved filler having a total weight substantially the same as said employed filler, and applying said improved filler and said adhesive to said fibrous body stock.

9. The method of producing coated paper comprising fibrous body stock and a coating comprising adhesive and improved alkaline filler produced from alkaline filler having oversize, intermediate and ultimate particles, which comprises substantially eliminating particles exceeding .001" in size, and maintaining the ultimate particles of substantially the same size as the ultimate particles in the alkaline filler employed in producing said improved alkaline filler, while substantially increasing the proportion of intermediate to ultimate particles over the proportion of the intermediate to ultimate particles in said employed alkaline filler, thus producing an improved filler having a total weight substantially the same as said employed filler, and applying said improved filler and said adhesive to said fibrous body stock.

10. Improved alkaline filler produced from alkaline filler having oversize, intermediate and ultimate particles, characterized by the fact that the proportion by weight of particles exceeding .001" in size is substantially reduced, the proportion by weight of intermediate particles is substantially correspondingly increased, and the proportion by weight and the size of ultimate particles are substantially unchanged, with respect to the alkaline filler employed in producing said improved filler, the total weight of said improved filler being substantially the same as said employed filler.

HAROLD ROBERT RAFTON.